United States Patent
Kai et al.

(10) Patent No.: US 10,950,914 B2
(45) Date of Patent: Mar. 16, 2021

(54) POROUS FILM, SEPARATOR FOR SECONDARY BATTERIES, AND SECONDARY BATTERY

(71) Applicant: Toray Industries, Inc., Tokyo (JP)

(72) Inventors: Nobuyasu Kai, Otsu (JP); Kei Ikoma, Nasushiobara (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/650,377

(22) PCT Filed: Sep. 25, 2018

(86) PCT No.: PCT/JP2018/035531
§ 371 (c)(1),
(2) Date: Mar. 24, 2020

(87) PCT Pub. No.: WO2019/065660
PCT Pub. Date: Apr. 4, 2019

(65) Prior Publication Data
US 2020/0295331 A1    Sep. 17, 2020

(30) Foreign Application Priority Data

Sep. 26, 2017  (JP) .............................. JP2017-184497

(51) Int. Cl.
*H01M 50/446*  (2021.01)
*B32B 27/28*   (2006.01)
*B32B 27/34*   (2006.01)

(52) U.S. Cl.
CPC ......... *H01M 50/446* (2021.01); *B32B 27/281* (2013.01); *B32B 27/34* (2013.01)

(58) Field of Classification Search
CPC ....... H01M 50/446; B32B 27/28; B32B 27/34
See application file for complete search history.

(56) References Cited

U.S. PATENT DOCUMENTS

2010/0099022 A1    4/2010  Nishida et al.
2014/0315068 A1*  10/2014  Nishikawa .......... H01M 10/052
                                                        429/145

FOREIGN PATENT DOCUMENTS

| JP | 2006-338917 A | 12/2006 |
|----|---------------|---------|
| JP | 2013-20769 A  | 1/2013  |
| JP | 2013-32491 A  | 2/2013  |
| JP | 5183435 B2    | 4/2013  |
| JP | 5286817 B2    | 9/2013  |
| JP | 2013-211160 A | 10/2013 |
| JP | 2014-198832 A | 10/2014 |

\* cited by examiner

*Primary Examiner* — Michael C Miggins
(74) *Attorney, Agent, or Firm* — DLA Piper LLP (US)

(57) ABSTRACT

A porous film includes a porous substrate, and a porous layer provided on at least one surface of the porous substrate. The porous layer includes the following resin A and resin B, and satisfies that $\alpha/\beta$ is less than 1.0, where $\alpha$ is a surface opening ratio of the porous layer and $\beta$ is a cross-sectional porosity of the porous layer. The resin A is a resin having a melting point of 150° C. or higher, or a resin having no substantial melting point. The resin B is a resin having a melting point of lower than 150° C., or an amorphous resin.

10 Claims, No Drawings

POROUS FILM, SEPARATOR FOR SECONDARY BATTERIES, AND SECONDARY BATTERY

TECHNICAL FIELD

This disclosure relates to a porous film, a secondary battery separator, and a secondary battery.

BACKGROUND

A secondary battery such as a lithium ion battery has been widely used for portable digital equipment such as a smart phone, a tablet, a mobile phone, a notebook computer, a digital camera, a digital video camera, and a handheld game console, portable equipment such as an electric tool, an electric motorcycle, and an electric assist bicycle, and an automobile such as an electric automobile, a hybrid vehicle, and a plug-in hybrid vehicle.

In general, the lithium ion battery has a structure in which a secondary battery separator and electrolytes are interposed between a positive electrode in which a positive electrode active material is laminated on a positive electrode current collector, and a negative electrode in which a negative electrode active material is laminated on a negative electrode current collector.

As the secondary battery separator, a polyolefin-based porous substrate is used. Examples of characteristics required for the secondary battery separator include: a characteristic that the secondary battery separator contains an electrolytic solution in a porous structure and enables movement of ions, and a shutdown characteristic that when a lithium ion battery generates heat abnormally, the porous structure is closed due to melting by the heat and the movement of ions is stopped, causing power generation to stop.

However, the secondary battery separator is required to have not only the above characteristics, but also higher heat resistance along with higher capacity and a higher output of the lithium ion battery in recent years. When the battery is further heated after the above shutdown characteristic is activated when the lithium ion battery generates heat abnormally, film rupture of the secondary battery separator occurs. In addition, when shock is applied to the lithium ion battery, the secondary battery separator generates heat under pressure locally applied and, then, film rupture of the secondary battery separator may occur. To prevent these problems, the secondary battery separator is required to have heat rupture resistance at high temperature in addition to the shutdown characteristic.

In a step of producing a secondary battery, adhesiveness between a separator before impregnation with an electrolytic solution and an electrode is required to: (i) maintain a laminated body obtained by laminating a positive electrode, a separator, and a negative electrode, when the laminated body is transported; (ii) prevent deformation of a shape of a laminated body of a wound positive electrode, separator, and negative electrode when the laminated body is inserted into a can such as a cylindrical type can and a square type can while being pressed; (iii) increase energy density by placing more laminated bodies in a can via pressing the laminated body; and (iv) further prevent deformation of a shape of a laminated body after the laminated body is inserted into an exterior material in the laminate type battery.

On the other hand, the lithium ion battery is also required to have excellent battery characteristics such as high output and long life so that battery characteristics are not allowed to deteriorate when the heat resistance is imparted to the secondary battery separator, and the lithium ion battery is required to exhibit good battery characteristics.

For these requests, Japanese Patent No. 5183435 describes that a heat shrinkage ratio is reduced by laminating a porous layer containing inorganic particles on a porous film mainly containing a polyolefin. Japanese Patent No. 5286817 describes that heat resistance is improved by laminating a heat resistant layer containing heat resistant resins. JP 2013-20769 A describes that heat resistance is improved by laminating heat resistant resins and adhesiveness with an electrode after an electrolytic solution is injected is improved by laminating fluorine resins.

However, although the heat shrinkage ratio is reduced by the inorganic particles in Japanese Patent No. 5183435, when temperature reaches a high-temperature range after shutdown, thermal film rupture of both the porous layer containing inorganic particles and a polyolefin as a substrate is likely to occur, and sufficient heat resistance cannot be ensured. In addition, adhesiveness with the electrode is not provided, and thus efficiency in the step of producing a secondary battery and high energy density cannot be achieved. In Japanese Patent No. 5286817 and JP 2013-20769 A, although the heat resistant resins are laminated, heat rupture resistance is low due to high porosity of the surface. When a proportion of the heat resistant resins is increased to improve the heat rupture resistance, the deterioration of the battery characteristics is large and the cost also increases. In addition, adhesiveness with the electrode is not provided, and thus efficiency in the step of producing a secondary battery and high energy density cannot be achieved. The adhesiveness of the adhesive porous layer described in JP 2013-20769 A is the adhesiveness with the electrode after injection of the electrolytic solution and is different from the adhesiveness with the electrode before the injection of the electrolytic solution.

It could therefore be helpful to provide a porous film and a secondary battery separator at low cost having high heat rupture resistance and adhesiveness with an electrode, and excellent battery characteristics, as well as to provide a secondary battery with high heat resistance, high productivity, high capacity, high output, long life and low cost.

SUMMARY

We sought to provide a porous film at low cost, the porous film having high heat rupture resistance, adhesiveness with an electrode, and excellent battery characteristics. We found that by preparing a porous film including a porous substrate and a porous layer provided on at least one surface of the porous substrate, the porous layer containing a resin A (resin A: a resin having a melting point of 150° C. or higher, or a resin having no substantial melting point) and a resin B (resin B: a resin having a melting point of lower than 150° C. or an amorphous resin), and satisfying that $\alpha/\beta$ is less than 1.0, wherein $\alpha$ is a surface opening ratio of the porous layer and $\beta$ is a cross-sectional porosity of the porous layer, the porous film having high heat rupture resistance and adhesiveness with an electrode and having excellent battery characteristics can be provided at low cost.

We thus provide:

(1) A porous film comprising:
a porous substrate; and
a porous layer provided on at least one surface of the porous substrate,
wherein the porous layer includes resin A and resin B, and satisfies that $\alpha/\beta$ is less than 1.0, wherein $\alpha$ is a surface opening ratio of the porous layer and β is a cross-sectional porosity of the porous layer:

resin A: a resin having a melting point of 150° C. or higher, or a resin having no substantial melting point; and resin B: a resin having a melting point of lower than 150° C., or an amorphous resin.

(2) The porous film according to (1), wherein the surface opening ratio α of the porous layer is 50% or less.

(3) The porous film according to (1) or (2), wherein the resin A is at least one kind of resin selected from the group consisting of polyamides, polyamide-imides, and polyimides.

(4) The porous film according to (3), wherein the resin A contains an aromatic polyamide containing a structure represented by formula (1):

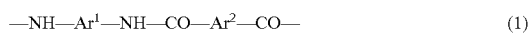

—NH—Ar$^1$—NH—CO—Ar$^2$—CO—   (1)

wherein Ar$^1$ and Ar$^2$ each represent an aromatic group.

(5) The porous film according to (4), wherein an intrinsic viscosity (η) of the aromatic polyamide is 3.0 dl/g or more and 8.0 dl/g or less.

(6) The porous film according to any one of (1) to (5), wherein a content of the resin A is equal to or more than 1 mass % and less than 50 mass % based on 100 mass % of the entire porous layer.

(7) The porous film according to any one of (1) to (6), wherein the resin B is at least one kind selected from fluororesins, acrylic resins, and olefin resins.

(8) The porous film according to any one of (1) to (7), wherein the porous layer contains an inorganic particle having an average particle diameter of 0.05 μm or more and 5 μm or less.

(9) A secondary battery separator comprising the porous film according to any one of (1) to (8).

(10) A secondary battery comprising the secondary battery separator according to (9).

By preparing a porous film including a porous substrate and a porous layer provided on at least one surface of the porous substrate, the porous layer containing a resin A (resin A: a resin having a melting point of 150° C. or higher, or a resin having no substantial melting point) and a resin B (resin B: a resin having a melting point of lower than 150° C. or an amorphous resin), and satisfying that α/β is less than 1.0, wherein α is a surface opening ratio of the porous layer and β is a cross-sectional porosity of the porous layer, the porous film having high heat rupture resistance and adhesiveness with an electrode and having excellent battery characteristics can be provided at low cost. By using the porous film, it is possible to provide a secondary battery with high heat resistance, high productivity, high capacity, high output, long life and low cost.

DETAILED DESCRIPTION

Our porous film includes a porous substrate and a porous layer provided on at least one surface of the porous substrate, and the porous layer contains a resin A (resin A: a resin having a melting point of 150° C. or higher, or a resin having no substantial melting point) and a resin B (resin B: a resin having a melting point of lower than 150° C. or an amorphous resin), and satisfies that α/β is less than 1.0, wherein α is a surface opening ratio of the porous layer and β is a cross-sectional porosity of the porous layer. The structure is described in detail below.

Porous Layer
Porous Structure

The porous layer in an example includes a porous structure. The porous structure refers to a structure including voids therein. When a surface opening ratio of the porous layer is denoted by α and a cross-sectional porosity of the porous layer is denoted by β, α/β for the porous structure of the porous layer is less than 1.0. α/β represents a ratio of the surface opening ratio to the porosity of the entire porous layer, and is a value indicating compatibility of heat rupture resistance and battery characteristics since α represents a value indicating the heat rupture resistance, and β represents a value indicating the battery characteristics. α/β is preferably 0.9 or less, more preferably 0.6 or less, still more preferably 0.4 or less, and most preferably 0.3 or less. When α/β is 1.0 or more, the porous film may not have sufficient heat rupture resistance, or may not have sufficient battery characteristics.

In addition, the surface opening ratio α of the porous layer is preferably 50% or less. The surface opening ratio α of the porous layer is more preferably 40% or less, still more preferably 30% or less, and most preferably 20% or less. When the surface opening ratio α of the porous layer is 50% or less, sufficient heat rupture resistance can be obtained.

The surface opening ratio α of the porous layer can be adjusted depending on a content of the resin A, a monomer of the resin A, a ratio or coating conditions. The cross-sectional porosity β of the porous layer can be adjusted depending on the content of the resin A, the monomer of the resin A, a ratio, a content of the resin B, or coating conditions.

Further, the cross-sectional porosity β of the porous layer is preferably 40% or more and 80% or less. The cross-sectional porosity β is more preferably 45% or more and 75% or less, and still more preferably 50% or more and 70% or less. When the cross-sectional porosity β of the porous layer is 40% or more, sufficient ion permeability can be obtained and battery characteristics are excellent. When the cross-sectional porosity β is 80% or less, sufficient heat rupture resistance can be obtained.

The surface opening ratio α and cross-sectional porosity β of the porous layer is obtained by using the following methods. Ion coating is performed on a surface and cross section of a porous layer, and image data of the surface and the cross section is obtained by a field emission scanning electron microscope (FE-SEM). Image analysis of the obtained image data is performed, and unopened parts are subtracted from the entire image so that an area of the opening portions is calculated and the surface opening ratio α and the cross-sectional porosity β can be obtained.

Resin A

The resin A means a resin having a melting point of 150° C. or higher, or a resin having no substantial melting point. For example, in Differential Scanning calorimetry (DSC) according to the regulation of "JIS K7121: 2012 Method for measuring transition temperature of plastic", after temperature is raised for the first time and lowered, a peak top of an endothermic peak at a second temperature rise is defined as the melting point. The resin having a melting point of 150° C. or higher refers to a resin having the above peak top, in the temperature region of 150° C. or higher.

The resin having no substantial melting point refers to a resin that does not have the peak top in a measurement temperature range of −20° C. to 300° C., and has a glass transition temperature of 150° C. or higher, or a resin that does not have the peak top in a measurement temperature range of −20° C. to 300° C. and does not have baseline shift in differential scanning calorimetry (DSC).

In addition, the method of measuring the melting point is not particularly limited. First, a porous layer is separated from a porous substrate in the porous film by using a solvent which is good for the porous layer and does not dissolve the porous substrate, for example, N-methyl-2-pyrrolidone. Then, for example, solid matter such as inorganic particles is removed from the obtained solution by a common method such as a centrifugation method, a sedimentation method, or a filtration method, and the remaining resins are separated by a using a common separation method such as liquid chromatography, gas chromatography, thin layer chromatography, a distillation method, a recrystallization method, or a precipitation method. Melting points of the obtained resin components can be measured by a differential scanning calorimeter.

The resin A preferably includes resins such as polyamides, polyamide-imides, polyimides, polyetherimides, polyvinylidene fluorides, vinylidene fluoride-hexafluoropropylene copolymers, polytetrafluoroethylenes, polysulfones, polyketones, polyetherketones, polycarbonates, and polyacetals, from the viewpoint of improving heat rupture resistance. Particularly, among them, the resin A is preferably at least one kind of resin selected from the group consisting of polyamides, polyamide-imides, and polyimides. The resin A is more preferably aromatic polyamides, aromatic polyamide-imides, or aromatic polyimides, and is still more preferably aromatic polyamides.

Examples of aromatic polyamides include meta-oriented aromatic polyamides and para-oriented aromatic polyamides. Either of meta-oriented aromatic polyamides or para-oriented aromatic polyamides may be used. From the viewpoint that the strength of the porous layer and the heat rupture resistance are excellent, para-oriented aromatic polyamides are preferred.

Para-oriented aromatic polyamides are obtained by polymerization of para-oriented aromatic diamines and para-oriented aromatic dicarboxylic halides, and contain repeating units represented by chemical formula (1) and/or chemical formula (2) as a basic skeleton.

Examples of $Ar^1$, $Ar^2$ and $A^3$ include a group represented by chemical formulas (3) to (7). In addition, each of X and Y in chemical formulas (6) and (7) may be selected from —O—, —CO—, —SO$_2$—, —CH$_2$—, —S—, —C(CH$_3$)$_2$ and the like, and are not limited to these.

  (1)

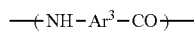  (2)

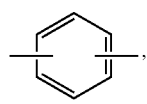  (3)

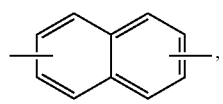  (4)

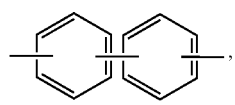  (5)

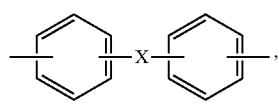  (6)

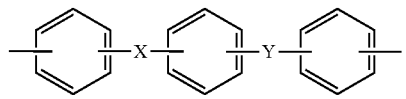  (7)

Specific examples of aromatic diamines include paraphenylenediamine, 4,4'-diaminodiphenyl ether, 3,4'-diaminodiphenyl ether, 4,4'-diaminobenzophenone, 3,3'-diaminobenzophenone, 2-chloro-1,4-phenylenediamine, 1,5'-naphthalenediamine, 4,4'-diaminodiphenyl sulfone and the like, and aromatic diamines are not limited to these examples.

Specific examples of aromatic dicarboxylic halides include terephthalic acid chloride, 2-chloroterephthalic acid chloride, isophthalic acid chloride, 2-chloroisophthalic acid chloride, 2,6'-naphthalenedicarboxylic acid chloride and the like, and the aromatic dicarboxylic halides are not limited to these examples.

The resin A preferably contains an aromatic polyamide having a structure represented by formula (1).

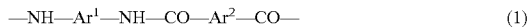 (1)

Wherein $Ar^1$ and $Ar^2$ each represent an aromatic group.

In the aromatic polyamide described above, 5 mol % or more and 80 mol % or less of $Ar^1$ represented by chemical formula (1) is preferably an aromatic group having ether groups. More preferred molar ratio thereof is 7 mol % or more and 60 mol % or less, and still more preferred molar ratio thereof is 10 mol % or more and 40 mol % or less. When the amount of the aromatic group having ether groups is less than 5 mol %, a sufficient porous structure may not be obtained, and battery characteristics may decrease. When the amount of the aromatic group is more than 80 mol %, sufficient heat rupture resistance may not be obtained. The strength of the porous layer may decrease, and sufficient heat resistance may not be obtained. In addition, elimination or deformation of the porous layer may occur in the production step.

A content of aromatic groups having ether groups in $Ar^1$ can be calculated as follows. First, 100 parts by mass of porous film samples in which a porous layer is laminated on a porous substrate, are fixed to a metal frame, and immersed for 24 hours at room temperature in 100 parts by mass of concentrated sulfuric acid, thereby recovering the porous layers from the samples. Then, insoluble contents (e.g., inorganic particles) are removed with a centrifugal separator, and the recovered resin components subjected to a combination of chemical methods (molecular weight analysis, mass spectrometry, nuclear magnetic resonance, fourier transform infrared spectroscopy and the like) to calculate the content of aromatic groups having ether groups.

In the aromatic polyamide described above, at least a part of the aromatic group of $A^1$ and $Ar^2$ in chemical formula (1) is preferably substituted with an electron-withdrawing group. 30 mol % to 100 mol % of the total amount of all the aromatic groups are more preferably aromatic groups having substituted electron-withdrawing group(s), and 50 mol % to 100 mol % thereof are still more preferably the aromatic groups having substituted electron-withdrawing group(s). The electron-withdrawing group refers to a group having electronegativity of 2.5 or more. Examples of the electron-withdrawing group include halogen groups such as a fluoro group, a chloro group, and a bromo group, halogenated alkyl groups such as a trifluoromethyl group, nitro groups, cyano groups, cyanate groups, phenyl groups and the like.

The intrinsic viscosity (η) of the aromatic polyamide is preferably 3.0 dl/g or more and 8.0 dl/g or less, more preferably 3.3 dl/g or more and 7.0 dl/g or less, and still more preferably 3.6 dl/g or more and 6.0 dl/g or less. By increasing the intrinsic viscosity, the degree of polymerization, that is, molecular weight of the aromatic polyamide is increased, thereby improving the heat resistance of the aromatic polyamide. Therefore, a secondary battery separator using an aromatic polyamide having high intrinsic viscosity can provide sufficient heat rupture resistance. However, when the intrinsic viscosity is too high, the handleability during polymerization may decrease, and the productivity may decrease. Therefore, when the intrinsic viscosity (η) is 3.0 dl/g or more, sufficient heat rupture resistance can be obtained. Alternatively, when the content of the aromatic polyamide is increased to improve the heat rupture resistance, the air permeability is increased, and the porosity is decreased. Accordingly, the battery characteristics may deteriorate. When the intrinsic viscosity (η) is 8.0 dl/g or less, the handleability during polymerization and the productivity are excellent. In addition, the aromatic polyamide can be sufficiently solved in a solvent, and aggregation of the aromatic polyamide molecules can be prevented, and a porous film can be easily formed.

Resin B

The term "resin B" means a resin having a melting point of lower than 150° C., or an amorphous resin. The resin having a melting point of lower than 150° C. is preferably a resin having a melting point of lower than 140° C., and more preferably a resin having a melting point of lower than 130° C. The above resin is still more preferably a resin having a melting point of lower than 100° C.

The term "amorphous resin" refers to a resin that does not have a melting point at a temperature range of −20° C. to 300° C., that is, does not have an endothermic peak, and has a glass transition temperature of lower than 150° C., in a measurement by a differential scanning calorimetry analyzer. For example, the glass transition temperature is measured by differential scanning calorimetry (DSC) according to the regulation of "JIS K7121: 2012 Method for measuring transition temperature of plastic", in which an intersection point of a straight line obtained by extending a baseline on a low temperature side, at the second temperature rise after temperature is raised for the first time and lowered, to the high temperature side, and a tangent drawn at a point where a slope of a curve at a step change part of glass transition is maximized, is determined as the glass transition temperature.

The resin B is preferably a resin having a melting point of lower than 150° C. or an amorphous resin because high adhesiveness with an electrode is obtained. In the step of adhering the electrode to the porous film, only a hot pressing step or a pressing step is often used, and at this time, the resin B is preferably a resin having a melting point of lower than 150° C. or an amorphous resin because a part of the porous layer enters a gap between the active materials of the electrode by heat or press, and the anchor effect is exhibited to enable adhesion to the electrode. When the resin B is a resin having a melting point of 150° C. or higher, sufficient adhesiveness with an electrode may not be obtained. The "melting point" and the "method of measuring the melting point" of the resin B are as described in the items of the resin A.

Examples of the resin B constituting the porous layer include fluororesins, acrylic resins, olefin resins such as polyethylenes and polypropylenes, styrene-butadiene resins, crosslinked polystyrenes, methyl methacrylate-styrene copolymers, polyimides, melamine resins, phenolic resins, polyacrylonitrile, silicon resins, urethane resins, polycarbonates, carboxymethyl celluloseresins and the like, and one kind of these resins may be used alone, or a plurality thereof may be used in combination. Among them, at least one kind selected from fluororesins, acrylic resins, and olefin resins is preferably used, and fluororesins or acrylic resins are more preferred, from the viewpoint of electrical stability and oxidation resistance.

Examples of the fluororesins include homopolymers such as polyvinylidene fluoride, polytetrafluoroethylene, polyvinyl fluoride, and polychlorotrifluoroethylene, and copolymers such as an ethylene-tetrafluoroethylene polymer and an ethylene-chlorotrifluoroethylene polymer. In addition, examples thereof include copolymers of homopolymers and tetrafluoroethylene, hexafluoropropylene, trifluoroethylene or the like. Among these fluororesins, polyvinylidene fluoride resins, particularly, resins made of copolymers of vinylidene fluoride and hexafluoropropylene is preferably used from the viewpoint of electrical stability and oxidation resistance.

The weight average molecular weight of the fluororesins is preferably 50,000 or more and 2,000,000 or less. The weight average molecular weight is more preferably 100,000 or more and 1,500,000 or less. The weight average molecular weight is still more preferably 200,000 or more and 1,000,000 or less. When the weight average molecular weight is less than 50,000, sufficient adhesiveness with an electrode may not be obtained. In addition, when the weight average molecular weight is more than 2,000,000, handling properties and coatability may decrease due to an increase in viscosity.

Examples of the acrylic resins include poly (meth)acrylic acid and poly (meth)acrylic acid ester. Examples of a monomer of the poly (meth)acrylic acid include acrylic acid and methacrylic acid, and examples of a monomer of poly (meth)acrylic acid ester include methyl acrylate, methyl methacrylate, ethyl acrylate, ethyl methacrylate, butyl acrylate, butyl methacrylate and the like. One kind of these compounds may be used alone, or two or more kinds thereof may be used in combination.

Inorganic Particles

The porous layer in an example preferably contains inorganic particles. When the porous layer contains inorganic particles, thermal dimensional stability and prevention of short circuit due to foreign matters can be imparted.

Specific examples of the inorganic particles include inorganic oxide particles such as aluminum oxide, boehmite, silica, titanium oxide, zirconium oxide, iron oxide, and magnesium oxide, inorganic nitride particles such as aluminum nitride and silicon nitride, poorly soluble ionic crystal particles such as calcium fluoride, barium fluoride, and barium sulfate. One kind of these particles may be used, or two or more kinds thereof may be mixed and used.

The average particle diameter of the inorganic particles to be used is preferably 0.05 μm or more and 5.0 μm or less. The average particle diameter thereof is more preferably 0.10 μm or more and 3.0 μm or less, and still more preferably 0.20 μm or more and 1.0 μm or less. When the average particle diameter is less than 0.05 μm, air permeability may increase due to dense porous layer. In addition, since the pore diameter is reduced, the impregnation property of the electrolytic solution may decrease and the productivity may be affected. When the average particle diameter is more than 5.0 μm, sufficient dimensional stability may not be obtained, and the thickness of the porous layer may increase, resulting in a decrease in battery characteristics.

Examples of the shape of the particles to be used include a spherical shape, a plate shape, a needle shape, a rod shape, and an oval shape, and any shape may be used. Among them, the spherical shape is preferred from the viewpoint of a surface modification property, dispersibility, and coatability.

Formation of Porous Layer

For example, the porous film includes a porous substrate and a porous layer provided on at least one surface of the porous substrate, and the porous layer contains a resin A (resin A: a resin having a melting point of 150° C. or higher, or a resin having no substantial melting point) and a resin B (resin B: a resin having a melting point of lower than 150° C. or an amorphous resin), and satisfies that $\alpha/\beta$ is less than 1.0, wherein $\alpha$ is a surface opening ratio of the porous layer and $\beta$ is a cross-sectional porosity of the porous layer. The porous film may be obtained by a method of producing a porous film, and the method is described below.

When aromatic polyamides are used as the resin A, the aromatic polyamides manufactured by a common production method such as solution polymerization of a diamine with an acid dichloride such as 2-chloroterephthaloyl chloride used as raw materials, resins, and inorganic particles, are dispersed in a solvent, thereby preparing a coating liquid. As the solvent allowing them to disperse, an aprotic organic polar solvent such as N-methyl-2-pyrrolidone, N,N-dimethylacetamide, dimethylformamide, and dimethyl sulfoxide may be used. Among them, N-methyl-2-pyrrolidone is particularly preferred from the viewpoint of formation of a porous structure in the later step.

In addition, a poor solvent for an aromatic polyamide may be added to facilitate the porosification. The poor solvent is not particularly limited as long as it is a liquid that hardly causes solvation with the aromatic polyamide, and specific examples thereof include water, alcohol-based solvents, and mixed solvents thereof. Among them, water is preferably added, and the amount of water to be added is preferably 500 parts by mass or less with respect to 100 parts by mass of aromatic polyamides. When the amount of water added is greater than 500 parts by mass, aromatic polyamides may be solidified in the coating liquid, and the stability of the coating agent may not be sufficiently obtained.

In addition, dispersants, thickeners, stabilizers, defoamers, and leveling agents may be added to the coating liquid as necessary.

As a method of dispersing the coating liquid, a common method may be used. The coating liquid is dispersed by, for example, a ball mill, a bead mill, a sand mill, a roll mill, a homogenizer, an ultrasonic homogenizer, a high pressure homogenizer, an ultrasonic device, paint shaker and the like. The plurality of mixing and dispersing machines may be combined to perform dispersion stepwise.

The order of preparing the coating liquid is not particularly limited. From the viewpoint of efficiency of a dispersion step, an order of preparing a coating liquid by mixing aromatic polyamides with an aprotic organic polar solvent and allowing the aromatic polyamides to dissolve therein, and adding resins, inorganic particles and other additives to the solution is preferred.

Next, the obtained coating liquid is applied to the porous substrate, followed by being immersed in a water tank and performing drying, and the porous layer is laminated. As a coating method, coating may be performed by common methods. It is possible to utilize, for example, dip coating, gravure coating, slit die coating, knife coating, comma coating, kiss coating, roll coating, bar coating, spray painting, dip coating, spin coating, screen printing, ink jetting printing, pat printing, other kinds of printing and the like.

The coating method is not limited to these, and a coating method may be selected depending on preferred conditions for the resin A to be used, the resin B, inorganic particles, binders, dispersants, leveling agents, a solvent to be used, a substrate and the like. To improve coatability, for example, a surface treatment for a surface to be coated such as a corona treatment or a plasma treatment may be performed on the porous substrate.

The content of the resin A in the porous layer is preferably equal to or more than 1 mass % and less than 50 mass %, and more preferably equal to or more than 3 mass % and less than 30 mass %, based on 100 mass % of the entire porous layer. The content of the resin A is still more preferably equal to or more than 5 mass % and less than 20 mass %. When the porous film contains a plurality of porous layers, the above feature should be considered for each porous layer.

When the content of the resin A in the porous layer is 1 mass % or more, sufficient heat rupture resistance may be obtained. When the content of the resin A in the porous layer is less than 50 mass %, the content of the resin A is not too large, a sufficient porous structure can be obtained, and the battery characteristics are improved. In addition, it is also advantageous in terms of cost. When the porous film contains a plurality of porous layers, regarding each porous layer, the content of the resin A in at least one layer is preferably equal to or more than 1 mass % and less than 50 mass %, and the content of the resin A in all the porous layers is more preferably equal to or more than 1 mass % and less than 50 mass %.

The content of the resin B in the porous layer is preferably 0.1 mass % or more and 30 mass % or less, more preferably 0.3 mass % or more and 10 mass % or less, and still more preferably 0.5 mass % or more and 5 mass % or less, based on 100 mass % of the entire porous layer.

When the content of the resin B in the porous layer is 0.1 mass % or more, sufficient adhesiveness with the electrode can be obtained. In addition, when the content of the resin B in the porous layer is 30 mass % or less, the content of the resin B is not too large, and sufficient heat rupture resistance can be obtained.

A thickness of the porous layer is preferably 1 µm or more and 8 µm or less. The thickness is more preferably 1.5 µm or more and 6 µm or less. The thickness is still more preferably 2 µm or more and 5 µm or less. The "thickness of the porous layer" refers to the thickness of the porous layer when the porous film includes a porous layer provided on one surface of the porous substrate, and refers to the total thickness of two porous layers when the porous film includes porous layers on both surfaces of the porous substrate. When the thickness of the porous layer is 1 µm or more, sufficient heat rupture resistance can be obtained. When the thickness of the porous layer is 8 µm or less, a sufficient porous structure can be obtained and battery characteristics can be prevented from decreasing. In addition, it is also advantageous in terms of cost. When the porous film includes porous layers on both surfaces of the porous substrate, the total thickness of the two porous layers is preferably 1 µm or more and 8 µm or less.

A rising value of air permeability due to lamination of porous layers is preferably 250 secs/100 cc or less. The above rising value is more preferably 200 secs/100 cc or less. The rising value of air permeability due to lamination of porous layers refers to a value obtained by subtracting the air permeability of the porous substrate alone from air permeability of the porous film having a porous layer, and represents a rising value of air permeability due to lamination of the porous layers. When the rising value of air permeability due to lamination of porous layers is 250 secs/100 cc or less, the battery characteristics are excellent.

Porous Substrate

The porous substrate refers to a substrate having pores inside. Examples of the porous substrate include a porous membrane with pores inside, a nonwoven fabric, or a porous membrane sheet made of fibrous materials and the like. As a material constituting the porous substrate, a resin that is electrically insulating, electrically stable, and stable in electrolytic solutions preferably constitutes the porous substrate. In addition, a resin to be used is preferably a thermoplastic resin having a melting point of 200° C. or lower, from the viewpoint of imparting shutdown functions. The shutdown function here refers to a function that when a lithium ion battery generates heat abnormally, the porous structure is closed due to melting by the heat and the movement of ions is stopped, causing power generation to stop.

Examples of the thermoplastic resin include polyolefin-based resins, and the above porous substrate is preferably a polyolefin-based porous substrate. In addition, the polyolefin-based porous substrate is more preferably a polyolefin-based porous substrate having a melting point of 200° C. or lower. Specific examples of the polyolefin-based resins include polyethylene, polypropylene, a copolymer thereof, and a mixture combining these compounds. For example, a single-layer porous substrate containing 90 mass % or more of polyethylene, a multilayer porous substrate composed of polyethylene and polypropylene and the like may be exemplified.

Examples of methods of producing the porous substrate include a porosification method in which a polyolefin-based resin is made into a sheet and then was stretched to become porous, and a porosification method in which a polyolefin-based resin is dissolved in a solvent such as liquid paraffin, and is made into a sheet, followed by extracting the solvent.

The thickness of the porous substrate is preferably 3 μm or more and 50 μm or less, and more preferably 5 μm or more and 30 μm or less. When the thickness of the porous substrate is more than 50 μm, internal resistance of porous substrate may increase. In addition, when the thickness of the porous substrate is less than 3 μm, production may become difficult and sufficient mechanical characteristics may not be obtained.

The air permeability of the porous substrate is preferably 50 secs/100 cc or more and 1,000 secs/100 cc or less. The air permeability is more preferably 50 secs/100 cc or more and 500 secs/100 cc or less. When the air permeability is more than 1,000 secs/100 cc, sufficient ion mobility may not be obtained, and the battery characteristics may deteriorate. When the air permeability is less than 50 secs/100 cc, sufficient mechanical characteristics may not be obtained.

Porous Film

The porous film includes the above porous layer provided on at least one surface of the porous substrate. The porous layer is preferably sufficiently porous to have ion permeability, and air permeability of the porous film is preferably 50 secs/100 cc or more and 1,000 secs/100 cc or less. The air permeability is more preferably 50 secs/100 cc or more and 500 secs/100 cc or less. The air permeability is still more preferably 50 secs/100 cc or more and 300 secs/100 cc or less. When the air permeability is more than 1,000 secs/100 cc, sufficient ion mobility may not be obtained, and the battery characteristics may deteriorate. When the air permeability is less than 50 secs/100 cc, sufficient mechanical characteristics may not be obtained.

Secondary Battery

The porous film may be preferably used for a separator for a secondary battery such as a lithium ion battery. The lithium ion battery has a structure in which a secondary battery separator and electrolytes are interposed between a positive electrode in which a positive electrode active material is laminated on a positive electrode current collector, and a negative electrode in which a negative electrode active material is laminated on a negative electrode current collector.

The positive electrode is an electrode in which a positive electrode material composed of active materials, binder resins, and conductive assistants is laminated on a current collector, and examples of the active materials include layered lithium-containing transition metal oxides such as $LiCoO_2$, $LiNiO_2$, and $Li(NiCoMn)O_2$, spinel-type manganese oxides such as $LiMn_2O_4$, iron-based compounds such as $LiFePO_4$ and the like. As the binder resin, a resin having high oxidation resistance may be used. Specific examples thereof include fluororesins, acrylic resins, styrene-butadiene resins and the like. As the conductive assistant, a carbon material such as carbon black and graphite may be used. As the current collector, a metal foil is preferred, and aluminum is particularly preferably used.

The negative electrode is an electrode in which a negative electrode material composed of active materials and binder resins is laminated on a current collector, and examples of the active materials include carbon materials such as artificial graphite, natural graphite, hard carbon, and soft carbon, lithium alloy materials with tin, silicon or the like, metal materials such as Li, lithium titanate ($Li_4Ti_5O_{12}$) and the like. As the binder resin, fluororesins, acrylic resins, styrene-butadiene resins and the like may be used. As the current collector, a metal foil is preferred, and a copper foil is particularly preferably used.

The electrolytic solution provides a field to move ions between a positive electrode and a negative electrode in a secondary battery, and is obtained by dissolving the electrolyte in an organic solvent. Examples of the electrolyte include $LiPF_6$, $LiBF_4$, $LiClO_4$ and the like, and $LiPF_6$ may be preferably used from the viewpoint of solubility in organic solvents and ionic conductivity. Examples of the organic solvent include ethylene carbonate, propylene carbonate, fluoroethylene carbonate, dimethyl carbonate, diethyl carbonate, ethyl methyl carbonate, gamma-butyrolactone, sulfolane and the like, and two or more kinds of these organic solvents may be mixed and used.

In a method of producing the secondary battery, first, the active materials and conductive assistants are dispersed in a binder solution to prepare a coating liquid for an electrode, the coating liquid is applied to a current collector, and the solvent is dried, thereby obtaining each of a positive electrode and a negative electrode. The thickness of the coating film after drying is preferably 50 μm or more and 500 μm or less. A secondary battery separator is disposed between the obtained positive electrode and negative electrode to contact an active material layer of each electrode, and they are sealed in an exterior material such as an aluminum laminate film, followed by injection of an electrolytic solution, and then a negative electrode lead or a safety valve are installed and the exterior material is sealed. The secondary battery obtained in this way has high heat rupture resistance and excellent battery characteristics, and further, production at low cost is enabled.

EXAMPLES

Our films, separators and batteries are described in detail with reference to Examples, but this disclosure is not limited thereto. The measurement method used in the example is described below.

Measurement Method (1) Surface Opening Ratio α and Cross Sectional Porosity β

In the surface opening ratio α, ion coating was performed on a surface of a porous film by using an ion coater, thereby preparing a sample. In the cross sectional porosity β, a porous film was frozen with liquid nitrogen and was irradiated with argon beams from an upper portion thereof to prepare a cross section (Cryo-BIB method), and ion coating was performed on the cross section by using an ion coater, thereby preparing a sample for measurement. The surface of the obtained sample and the cross section of the obtained sample for measurement were observed at a magnification of 20,000 times and a magnification of 40,000 times, respectively, by using a field emission scanning electron microscope (FE-SEM) S4800 manufactured by Hitachi High-Technologies Corporation under an acceleration voltage of 1.5 kV, and image data was obtained (image of only an observation part without a display such as a scale bar). An image was cut out from the obtained image data to only remain the porous layer, image analysis was performed using HALCON Ver. 10.0 manufactured by MVTec, and the surface opening ratio α (%) and cross sectional porosity β (%) were determined. In the image analysis method, an 11-pixel average image A and a 3-pixel average image B were generated for a 256-tone monochrome image first, and an area (Area_all) of the entire image B was determined.

Next, the image A was removed from the image B as difference to generate image C, and a region D satisfying "luminance≥10" was extracted therefrom. The extracted region D was divided into blocks, and a region E satisfying "area≥100" was extracted. A region F subjected to closing treatment with a circular element having a radius of 2.5 pixels was generated for the region E, and a region G subjected to an opening treatment with a rectangular element of 1 (horizontal)×5 (vertical) pixels was generated so that pixels satisfying "vertical size<5" was removed. The extracted region G was divided into blocks, and a region H satisfying "area≥500" was extracted therefrom so that a fibril region was extracted.

Further, a region I satisfying "image≥5" was extracted from the image C, the region I was divided into blocks, and a region J satisfying "area≥300" was extracted therefrom. The region J was subjected to an opening treatment with a circular element having a radius of 1.5 pixels and then subjected to a closing treatment with a circular element with a radius of 8.5 pixels, thereby generating a region K. From the region K, a region L satisfying "area≥200" was extracted. A region M which was obtained by filling dark areas satisfying "area≥4,000 pixels" with bright areas in the region L was generated, thereby extracting a region of unopened parts other than fibrils.

Finally, a total region N of the region H and the region M was generated, and an area of the total region N (Area_closed) was determined, thereby determining the area of the unopened parts. The calculation of the surface opening ratio α and the cross-sectional porosity β was performed based on the following equation.

Surface opening ratio α(%), cross sectional porosity β(%)=(Area_all−Area_closed)/Area_all×100

α/β was calculated in accordance with the following equation based on the obtained surface opening ratio α and cross-sectional porosity β.

α/β=Surface Opening Ratio α (%)/Cross Sectional Porosity β (%)

10 places on both surfaces of the same porous film were measured according to the above method, and an average value thereof was determined as α/β of the sample.

(2) Intrinsic Viscosity (η)

An aromatic polyamide as the resin A was dissolved at a concentration of 0.5 g/dl in N-methylpyrrolidone (NMP) to which 2.5 mass % of lithium bromide (LiBr) was added, and flow time thereof was measured at 30° C. by using an ubbelohde viscometer. The flow time of NMP as a blank solution in which the polymer was not dissolved was also measured in the same manner, and the intrinsic viscosity (η) (dl/g) was calculated using the following equation.

Intrinsic viscosity $(\eta)(dl/g)=[\ln(t/t_0)]/0.5$ $t_0$: Flow time of blank solution (sec)

t: Flow time of sample (sec).

(3) Thermal Film Rupture Temperature

A porous film having a size of 50 mm×50 mm was cut out to be a sample, the sample interposed between two stainless steel plates each having a through hole of 12 mm at the center thereof and, further, the two stainless steel plates were interposed between two heating block plates each having a through hole of 12 mm at the center thereof from both surfaces. A ball having a diameter of 9.5 mm made of tungsten was placed in the through hole, the temperature of the heating blocks was raised at 5° C./min and the temperature at which the ball fell measured. Five samples each having a size of 50 mm×50 mm were prepared, and the average value of the performed measurements determined as the thermal film rupture temperature. The temperature being lower than 160° C. was evaluated as "D", the temperature being equal to or higher than 160° C. and lower than 250° C. was evaluated as "C", the temperature being equal to or higher than 250° C. and lower than 300° C. was evaluated as "B", and the temperature being equal to or higher than 300° C. was evaluated as "A".

(4) Melting Point

In the differential scanning calorimetry (DSC) according to the regulation of "JIS K7121: 2012 Method for measuring transition temperature of plastic", 6 to 7 mg of resin A and 6 to 7 mg of resin B were respectively placed in different measurement pans in a DSC (Differential Scanning Calorimeter) manufactured by PerkinElmer, thereby preparing samples for measurement, and the measurement was performed according to the following conditions. After temperature was raised for the first time and lowered, temperature of a peak top of an endothermic peak at a second temperature rise was defined as the melting point.

Rate of temperature rise and fall: ±10° C./min

Range of measurement temperature: −20° C. to 300° C.

(5) Adhesiveness With Electrode

A porous film and a positive electrode of 15 mm×100 mm, in which an active material was $LiCoO_2$, a binder was a vinylidene fluoride resin, and a conductive assistant was carbon black, were disposed such that the active material contacts the porous layer, followed by subjecting to hot pressing at 0.5 MPa, 100° C., and 0.2 m/min by a hot roll press machine, followed by peeling off the porous film manually using tweezers, and the adhesive strength was evaluated based on the following four grades. Similarly, adhesive strength between a porous film and a negative electrode in which an active material was graphite, a binder was a vinylidene fluoride resin, and a conductive assistant was carbon black was also measured, each of the positive electrode and the negative electrode was evaluated, and the result was defined as the adhesive strength.

Adhesive strength "A": The porous film was peeled off from the electrode with a strong force.
Adhesive strength "B": The porous film was peeled off from the electrode with a slightly strong force.
Adhesive strength "C": The porous film was peeled off from the electrode with a weak force.
Adhesive strength "D": The porous film was peeled off from the electrode with an extremely weak force.

(6) Production of Battery

An aluminum foil was coated with a positive electrode slurry which was obtained by dispersing 92 parts by mass of $Li(Ni_{5/10}Mn_{2/10}Co_{3/10})O_2$ as a positive electrode active material, 2.5 parts by mass of acetylene black and graphite as the positive electrode conductive assistant, and 3 parts by mass of polyvinylidene fluoride as a positive electrode binder into N-methyl-2-pyrrolidone by using a planetary mixer, followed by performing drying and rolling, thereby producing a positive electrode sheet (coating basis weight: 9.5 mg/cm$^2$).

This positive electrode sheet was cut out to be 40 mm×40 mm. At this time, a current-collecting tab-attached portion having no active material layer was cut out to have a size of 5 mm×5 mm outside an active material surface. An aluminum tab having a width of 5 mm and a thickness of 0.1 mm was ultrasonically welded to the tab-attached portion.

A copper foil was coated with a negative electrode slurry which was obtained by dispersing 98 parts by mass of natural graphite as a negative electrode active material, 1 part by mass of carboxymethylcellulose as a thickener, 1 part by mass of styrene-butadiene copolymer as a negative electrode binder into water by using a planetary mixer, followed by performing drying and rolling, thereby producing a negative electrode sheet (coating basis weight: 5.5 mg/cm$^2$).

This negative electrode sheet was cut out to be 45 mm×45 mm. At this time, a current-collecting tab-attached portion having no active material layer was cut out to have a size of 5 mm×5 mm outside an active material surface. A copper tab having the same size as the positive electrode tab was ultrasonically welded to the tab-attached portion.

Next, the porous film was cut out to be 55 mm×55 mm, the positive electrode and the negative electrode are stacked on both surfaces of the porous film so that the porous film was interposed between the active material layers, and all the positive electrode coating portion was disposed to face the negative electrode coating portion to obtain an electrode group. The above positive electrode, negative electrode and porous film were interposed between one sheet of aluminum laminated film of 90 mm×200 mm, long sides of the aluminum laminated film were folded, and the two long sides of the aluminum laminated film were heat-sealed to form a bag.

An electrolytic solution which was prepared by dissolving $LiPF_6$, as a solute, in a mixed solvent containing ethylene carbonate and diethyl carbonate (ethylene carbonate:diethyl=1:1 (volume ratio)) to reach a concentration of 1 mol/liter, was used. 1.5 g of electrolytic solutions were injected into the bag-shaped aluminum laminated film, and the short side portion of the aluminum laminated film was thermally fused while impregnating under reduced pressure to obtain a laminate type battery.

(7) Discharge Load Characteristics

Tests were performed on the discharge load characteristics according to the following procedure, and the discharge load characteristics were evaluated based on a discharge capacity retention ratio.

The above laminate type battery was measured in terms of discharge capacity at the time of discharging at 0.5 C at 25° C. and discharge capacity at the time of discharging at 10 C at 25° C., and a discharge capacity retention ratio was calculated as follows: "(discharge capacity at 10 C)/(discharge capacity at 0.5 C)×100". A charge condition was constant current charge at 0.5 C and 4.3 V, and a discharge condition was constant current discharge at 2.7 V. Five laminated type batteries were produced, and an average value of three measurement results obtained by removing results of the maximum discharge capacity retention ratio and the minimum discharge capacity retention ratio from the five measurement results, was determined as the capacity retention ratio. An example where a discharge capacity retention ratio was less than 55% was evaluated as "D", an example where a discharge capacity retention ratio was 55% or more and less than 65% was evaluated as "B", and an example where a discharge capacity retention ratio was 65% or more was evaluated as "A".

(8) Charge and Discharge Cycle Characteristics

Tests were performed on the charge and discharge cycle characteristics according to the following procedure, and the charge and discharge cycle characteristics were evaluated based on a discharge capacity retention ratio.

1st to 300th Cycles

One charge and one discharge were regarded as one cycle, and charge and discharge was repeated 300 times at 25° C. under a charge condition of constant current charge at 2 C and 4.3 V and a discharge condition of constant current discharge at 2 C and 2.7 V.

Calculation of Discharge Capacity Retention Ratio

The discharge capacity retention ratio was calculated as follows: (discharge capacity at 300th cycle)/(discharge capacity at 1st cycle)×100. Five laminated type batteries were produced, and an average value of three measurement results obtained by removing results of the maximum discharge capacity retention ratio and the minimum discharge capacity retention ratio from the five measurement results, was determined as the capacity retention ratio. An example where a discharge capacity retention ratio was less than 60% was evaluated as "D", an example where a discharge capacity retention ratio was 60% or more and less than 70% was evaluated as "B", and an example where a discharge capacity retention ratio was 70% or more was evaluated as "A".

Example 1

2-chloro-1,4-phenylenediamine equivalent to 85 mol % based on the total amount of diamine and 4,4'-diaminodiphenyl ether equivalent to 15 mol % were dissolved in dehydrated N-methyl-2-pyrrolidone. 2-chloroterephthaloyl chloride equivalent to 98.5 mol % to the total amount of diamine was added as acid dichloride to the above obtained solution, followed by stirring, thereby polymerizing the aromatic polyamides. The obtained polymerization solution was neutralized with lithium carbonate in an amount of 97 mol % based on the total amount of the acid dichloride, and further was neutralized with 15 mol % of diethanolamine and 25 mol % of triethanolamine, and thus an aromatic polyamide solution having a concentration of the aromatic polyamide being 10 mass % was obtained. The intrinsic viscosity (η) of the aromatic polyamide was 3.0 dl/g, and the aromatic polyamide was a resin having no melting point within −20° C. to 300° C. and showing no baseline shift in differential scanning calorimetry (DSC).

N-methyl-2-pyrrolidone was added to the obtained aromatic polyamide solution, further fluororesin (copolymer of vinylidene fluoride and hexafluoropropylene, melting point: 130° C.) was added as the resin B such that the concentration was 1 mass % in 100 mass % of the entire porous layer, and the mixture was stirred by a stirrer. Then, alumina particles (average particle diameter: 0.4 μm) were added so that the concentration of the aromatic polyamide was 10 mass % in 100 mass % of the entire porous layer. The mixed solution was preliminarily dispersed by a stirrer, and then dispersed using a bead mill to obtain a coating liquid.

The obtained coating liquid was applied to both surfaces of a polyethylene porous substrate (thickness: 5 μm, air permeability: 120 seconds/100 cc) by dip coating, followed by being immersed in a water tank and drying until the solvent contained therein was volatilized, thereby forming a porous layer, and thus our porous film was obtained. Table 1 shows the measurement results of the obtained porous film in terms of the surface opening ratio α and the cross-sectional porosity β of the porous layer, thickness of the porous layers on both surfaces, thermal film rupture temperature, adhesiveness with an electrode, discharge load characteristics, and charge and discharge cycle characteristics.

Example 2

A porous film was obtained in the same manner as Example 1 except that the resin B was added such that the concentration was 5 mass % in 100 mass % of the entire porous layer.

Example 3

A porous film was obtained in the same manner as Example 1 except that the concentration of the aromatic polyamide was changed to 20 mass % in 100 mass % of the entire porous layer.

Example 4

A porous film was obtained in the same manner as Example 1 except that the concentration of the aromatic polyamide was changed to 4 mass % in 100 mass % of the entire porous layer.

Example 5

A porous film was obtained in the same manner as Example 1 except that the resin A was changed to an aromatic polyamide (which was obtained in the same manner as Example 1 except that 2-chloroterephthaloyl chloride equivalent to 99.0 mol % based on the total amount of diamine was added as acid dichloride; and which was a resin having an intrinsic viscosity (η) of 4.3 dl/g, having no melting point within −20° C. to 300° C., and showing no baseline shift in differential scanning calorimetry (DSC)).

Example 6

A porous film was obtained in the same manner as Example 1 except that the resin A was changed to an aromatic polyamide (which was obtained in the same manner as Example 1 except that 2-chloroterephthaloyl chloride equivalent to 99.5 mol % based on the total amount of diamine was added as acid dichloride; and which was a resin having an intrinsic viscosity (η) of 5.0 dl/g, having no melting point within −20° C. to 300° C., and showing no baseline shift in differential scanning calorimetry (DSC)), and the resin B was added such that the concentration was 5 mass % in 100 mass % of the entire porous layer.

Example 7

A porous film was obtained in the same manner as Example 1 except that the resin B was added such that the concentration was 10 mass % in 100 mass % of the entire porous layer.

Example 8

A porous film was obtained in the same manner as Example 1 except that the resin A was changed to an aromatic polyamide (which was obtained in the same manner as Example 1 except that 2-chloroterephthaloyl chloride equivalent to 98.0 mol % based on the total amount of diamine was added as acid dichloride; and which was a resin having an intrinsic viscosity (η) of 2.5 dl/g, having no melting point within −20° C. to 300° C., and showing no baseline shift in differential scanning calorimetry (DSC)).

Example 9

A porous film was obtained in the same manner as Example 1 except that the coating liquid was applied to both surfaces of the polyethylene porous substrate by dip coating, followed by maintaining it for 10 seconds in an environment of a temperature of 60° C. and a humidity of 60%.

Example 10

A porous film was obtained in the same manner as Example 1 except that the fluororesin (a copolymer of vinylidene fluoride and hexafluoropropylene, amorphous resin having no melting point and having a glass transition temperature of −40° C.) was added as the resin B such that the concentration was 5 mass % in 100 mass % of the entire porous layer.

Example 11

A porous film was obtained in the same manner as Example 1 except that an acrylic resin (an aqueous dispersion of particles having an average particle diameter of 100 nm, melting point: 50° C.) was added as the resin B such that the concentration was 5 mass % in 100 mass % of the entire porous layer.

Example 12

A porous film was obtained in the same manner as Example 1 except that a polyethylene resin (an aqueous dispersion of particles having an average particle diameter of 100 nm, melting point: 90° C.) was added as the resin B such that the concentration was 5 mass % in 100 mass % of the entire porous layer.

Comparative Example 1

A porous film was obtained in the same manner as Example 1 except that the fluororesin (a copolymer of vinylidene fluoride and hexafluoropropylene, melting point: 165° C.) was added as the resin B such that the concentration was 5 mass % in 100 mass % of the entire porous layer.

Comparative Example 2

A porous film was obtained in the same manner as Example 1 except that the resin B was added such that the concentration was 5 mass % in 100 mass % of the entire porous layer, and the obtained coating liquid was applied to both surfaces of the polyethylene porous substrate by dip coating, followed by maintaining it for 10 seconds in an environment of a temperature of 80° C. and a humidity of 80%.

INDUSTRIAL APPLICABILITY

Our porous composite film has high heat rupture resistance and adhesiveness with an electrode, and the secondary battery separator having excellent battery characteristics can be provided at low cost. Further, the secondary battery with

TABLE 1

| | Resin A | | | Resin B | | | | Surface opening ratio/cross sectional porosity ($\alpha/\beta$) |
|---|---|---|---|---|---|---|---|---|
| | Kind of resin A | Intrinsic viscosity of resin A (dl/g) | Content of resin A (mass %) | Kind of resin B | Melting point of resin B (° C.) | Content of resin B (mass %) | Surface opening ratio $\alpha$ (%) | Cross sectional porosity $\beta$ (%) |
| Example 1 | Aromatic polyamide | 3.0 | 10 | Fluororesin | 130 | 1 | 10 | 63 | 0.2 |
| Example 2 | Aromatic polyamide | 3.0 | 10 | Fluororesin | 130 | 5 | 10 | 55 | 0.2 |
| Example 3 | Aromatic polyamide | 3.0 | 20 | Fluororesin | 130 | 1 | 5 | 50 | 0.1 |
| Example 4 | Aromatic polyamide | 3.0 | 4 | Fluororesin | 130 | 1 | 10 | 66 | 0.2 |
| Example 5 | Aromatic polyamide | 4.3 | 10 | Fluororesin | 130 | 1 | 10 | 60 | 0.2 |
| Example 6 | Aromatic polyamide | 5.0 | 10 | Fluororesin | 130 | 5 | 10 | 55 | 0.2 |
| Example 7 | Aromatic polyamide | 3.0 | 10 | Fluororesin | 130 | 10 | 10 | 45 | 0.2 |
| Example 8 | Aromatic polyamide | 2.5 | 10 | Fluororesin | 130 | 1 | 10 | 63 | 0.2 |
| Example 9 | Aromatic polyamide | 3.0 | 10 | Fluororesin | 130 | 1 | 40 | 63 | 0.6 |
| Example 10 | Aromatic polyamide | 3.0 | 10 | Fluororesin | — | 5 | 10 | 55 | 0.2 |
| Example 11 | Aromatic polyamide | 3.0 | 10 | Acrylic resin | 50 | 5 | 10 | 60 | 0.2 |
| Example 12 | Aromatic polyamide | 3.0 | 10 | Polyethylene resin | 90 | 5 | 10 | 60 | 0.2 |
| Comparative Example 1 | Aromatic polyamide | 3.0 | 10 | Fluororesin | 165 | 5 | 10 | 55 | 0.2 |
| Comparative Example 2 | Aromatic polyamide | 3.0 | 10 | Fluororesin | 130 | 5 | 60 | 55 | 1.1 |

| | Thickness of porous layers on both surfaces (µm) | Thermal film rupture temperature | Adhesiveness with electrode | Discharge load characteristics | Charge and discharge cycle characteristics |
|---|---|---|---|---|---|
| Example 1 | 4.0 | B | B | A | A |
| Example 2 | 4.0 | B | A | A | A |
| Example 3 | 4.0 | A | B | B | B |
| Example 4 | 4.0 | C | B | A | A |
| Example 5 | 4.0 | A | B | A | A |
| Example 6 | 4.0 | A | A | A | A |
| Example 7 | 4.0 | C | A | C | C |
| Example 8 | 4.0 | C | B | A | A |
| Example 9 | 4.0 | C | C | A | A |
| Example 10 | 4.0 | B | A | A | A |
| Example 11 | 4.0 | B | A | A | A |
| Example 12 | 4.0 | B | A | A | A |
| Comparative Example 1 | 4.0 | A | D | A | A |
| Comparative Example 2 | 4.0 | D | B | A | A |

From Table 1, the porous films in all the Examples 1 to 12 are a porous film including a porous substrate and a porous layer provided on at least one surface of the porous substrate, in which the porous layer contains a resin A and a resin B, the resin B has a melting point of lower than 150° C. or is an amorphous resin, and satisfies that $\alpha/\beta$ is less than 1.0 wherein $\alpha$ is a surface opening ratio of the porous layer and $\beta$ is a cross-sectional porosity of the porous layer. Accordingly, sufficient heat rupture resistance, adhesiveness with an electrode, and good battery characteristics are obtained.

In contrast, in Comparative Example 1, the melting point of the resin used was high, and sufficient adhesiveness with an electrode is not obtained. In addition, in Comparative Example 2, since the surface opening ratio is high and $\alpha/\beta$ is more than 1.0, sufficient heat rupture resistance is not obtained.

high heat resistance, high productivity, high capacity, high output, long life and low cost can be provided.

Although our films, separators and batteries are described in detail with reference to specific examples, it will be apparent to those skilled in the art that various changes and modifications can be made without departing from the spirit and scope of this disclosure and the appended claims.

This application is based on Japanese Patent Application No. 2017-184497 filed on Sep. 26, 2017, the content of which is incorporated herein by reference.

The invention claimed is:

1. A porous film comprising:
   a porous substrate; and
   a porous layer provided on at least one surface of the porous substrate,
   wherein the porous layer includes resin A and resin B, and satisfies that $\alpha/\beta$ is less than 1.0, wherein $\alpha$ is a surface opening ratio of the porous layer and $\beta$ is a cross-sectional porosity of the porous layer:

resin A: a resin having a melting point of 150° C. or higher, or a resin having no substantial melting point; and resin B: a resin having a melting point of lower than 150° C., or an amorphous resin.

2. The porous film according to claim 1, wherein the surface opening ratio α of the porous layer is 50% or less.

3. The porous film according to claim 1, wherein a content of the resin A is equal to or more than 1 mass % and less than 50 mass % based on 100 mass % of the entire porous layer.

4. The porous film according to claim 1, wherein the resin B is at least one kind selected from fluororesins, acrylic resins, and olefin resins.

5. The porous film according to claim 1, wherein the porous layer contains an inorganic particle having an average particle diameter of 0.05 μm or more and 5 μm or less.

6. The porous film according to claim 1, wherein the resin A is at least one kind of resin selected from the group consisting of polyamides, polyamide-imides, and polyimides.

7. The porous film according to claim 6, wherein the resin A contains an aromatic polyamide containing a structure represented by formula (1):

$$—NH—Ar^1—NH—CO—Ar^2—CO— \quad (1)$$

wherein $Ar^1$ and $Ar^2$ each represent an aromatic group.

8. The porous film according to claim 7, wherein an intrinsic viscosity (η) of the aromatic polyamide is 3.0 dl/g or more and 8.0 dl/g or less.

9. A secondary battery separator comprising the porous film according to claim 1.

10. A secondary battery comprising the secondary battery separator according to claim 9.

* * * * *